United States Patent [19]

Vandenabeele et al.

[11] Patent Number: 5,753,425
[45] Date of Patent: May 19, 1998

[54] SILVER HALIDE PHOTOGRAPHIC MATERIAL COMPRISING SPACING PARTICLES

[75] Inventors: Hubert Vandenabeele; Daniel Timmerman; Ronny De Clercq, all of Mortsel, Belgium

[73] Assignee: AGFA-Gevaert, N.V., Mortsel, Belgium

[21] Appl. No.: 593,353

[22] Filed: Jan. 29, 1996

[30] Foreign Application Priority Data

Feb. 8, 1995 [EP] European Pat. Off. ............ 95200307

[51] Int. Cl.$^6$ ............................... G03C 1/76; G03C 1/95
[52] U.S. Cl. ................ 430/496; 430/531; 430/536; 430/537; 430/523; 430/950; 430/961
[58] Field of Search ..................... 430/950, 531, 430/536, 537, 496, 523, 961

[56] References Cited

U.S. PATENT DOCUMENTS

| | | | |
|---|---|---|---|
| 4,614,708 | 9/1986 | Timmerman et al. | 430/950 |
| 4,777,113 | 10/1988 | Inoue et al. | 430/950 |
| 4,861,818 | 8/1989 | Timmerman et al. | 524/460 |
| 5,286,597 | 2/1994 | Suzuki et al. | 430/950 |
| 5,370,982 | 12/1994 | Tashiro et al. | 430/536 |

FOREIGN PATENT DOCUMENTS

| | | | |
|---|---|---|---|
| 0080225 | 6/1983 | European Pat. Off. | G03C 1/76 |
| 0726490 | 2/1995 | European Pat. Off. | G03C 1/95 |

*Primary Examiner*—Mark F. Huff
*Attorney, Agent, or Firm*—Breiner & Breiner

[57] ABSTRACT

A silver halide photographic material is provided comprising at least one silver halide emulsion layer and an outermost layer comprising an hydrophillic binder and polymeric spacing particles characterized in that (i) the outermost layer has a thickness between 0.3 to 0.9 pm and (ii) the polymeric spacing particles comprise at the surface alkali metal carboxylate or sulphonate groups equivalent to an acid value greater than 1.0 mg KOH per 1 g of polymeric spacing particles. In a preferred embodiment the said spacing particles have a volume average diameter ($d_{v50}$) that is 5 to 30 times larger than the thickness of the outermost layer.

6 Claims, No Drawings

SILVER HALIDE PHOTOGRAPHIC MATERIAL COMPRISING SPACING PARTICLES

DESCRIPTION

1. Field of the Invention

This invention relates to a photographic material intended for rapid processing comprising polymeric spacing particles that have high compatibility with hydrophillic binder materials. In particular, but not exclusively, this invention relates to X-ray recording materials, intended for rapid processing, comprising a silver halide emulsion layer and a thin protective layer comprising an hydrophillic colloid binder wherein said protective layer comprises polymeric spacing particles.

2. Background of the Invention

The use of polymeric spacing particles in photographic materials is well known in the art. Examples of polymeric spacing particles useful in photosensitive materials are disclosed in e.g. EP-A 0 281 928, EP-A 0 136 506, EP-A 0 080 225 and EP-A 0 466 982.

Polymeric spacing particles are added to the outermost layer of photographic material to overcome problems with sticking, statics, transportation in dry as well as in wet state, etc. Especially in photographic materials intended to be transported in automatic film handling systems the use of polymeric spacing particles is well known. Examples of such photographic materials are, e.g., X-ray recording films that are transported in, e.g. automatic film changers, daylight film handling systems.

The use of polymeric spacing particles in photographic materials can also bring about problems. Various of these problems have been addressed, e.g. to overcome a reduction in slidability of the photographic material due to incorporation of polymeric spacing particles it has been proposed in EP-A 0 281 928 to incorporate fluorine containing monomers in the polymeric spacing particles. In some applications the presences of spacing particles in the finished image is undesirable since it can give the final image a grainy appearance, therefor it has been disclosed in, e.g. EP-A 0 350 022 and EP-A 0 370 405, to use alkali soluble polymeric spacing particles that dissolve in the developer. In EP-A 610 522 it is disclosed to use a combination of alkali-soluble and alkali-insoluble spacing particles to have the right balance between stickiness of the material in the processor and granularity of the material.

Spacing particles can be too heavy and can, during manufacture of the photographic material, be forced through the silver halide emulsion layer on to the support, pushing away the light sensitive composition. When such a photographic materials is imagewise exposed and processed, the image density in the area underlying the spacing particles is lowered, even reduced to zero. These areas appear in the image as white spot on a dark background, this gives rise to what has been called "a starry night" effect, due to the similarity in appearance to a starry night sky. It is possible to minimize or even avoid the "starry night" effect by using very small spacing particles, e.g., silica particles with maximum diameter of 0.124 μm as disclosed in U.S. Pat. No. 4,777,113. But by doing so, also the spacing effect is minimized. In, e.g. EP-A 0 307 856 it has been disclosed that it is possible to prevent polymeric spacing particles comprised in a surface layer from being forced through the emulsion layer, provided that said polymeric spacing particles are individually covered with gelatin covalently bonded to the particle.

Another problem with the use of alkali insoluble spacing particles, be it polymeric or inorganic as e.g. $SiO_2$, is loss of the spacing particles during the processing. When spacing particles are pulled out of the photographic material during processing, the insoluble particles accumulate in the processing machine and give rise to sludge that can stain film, obstruct filters in the processing machine etc.

This problem of keeping spacing particles firmly attached in the matrix of an outermost layer (at least 1 μm thick) has been addressed in various ways. In the already mentioned EP-A 0 307 856, e.g., it has not only been disclosed that it is possible to prevent polymeric spacing particles comprised in a surface layer from being forced through the emulsion layer, provided that said polymeric spacing particles are individually covered with gelatin covalently bonded to the particle, but that such spacing particles can be bonded to the gelatin binder of the surface layer and that thus these particles are not pulled out of the layer during processing. The preparation of gelatin loaded polymeric particles is not very straightforward and time consuming.

In U.S. Pat. No. 5,279,934, e.g., it is disclosed to load the polymeric spacing particle with polymeric latex colloidal particles that have an affinity for gelatin. Also in this case the preparation of the polymeric spacing particles is rather complicated and involves at least a two step reaction. In U.S. Pat. No. 5,288,598 it is disclosed to use colloidal silica instead of polymeric latex colloidal particles to load the polymeric spacing particles to increase their affinity for gelatin.

In U.S. Pat. No. 5,057,407, e.g., it is disclosed to copolymerize a monomer having a group that is compatible and/or cross-linkable with gelatin into the polymeric spacing particles.

Nowadays the need to provide silver halide photographic materials, that can be processed in an automatic processing machine in a very short processing time (i.e. a short dry-to-dry cycle) in order to have the dry image available very shortly after introducing the exposed material in the automatic processing machine, has become more and more prevalent. This is so in all areas where silver halide materials are used, e.g. graphic arts, radiology, pictorial photography etc.

The slowest step in the processing of silver halide materials is the drying step which is performed after developing, fixing and rinsing. It is therefore necessary that the amount of water that is absorbed in the material before the drying step is as low as possible. This can best be achieved by minimizing the hydrophillic colloid contained in the silver halide material. This is done a.o. by minimizing the hydrophillic colloid (mostly gelatin) content of the protective layer that usually is present as outermost layer in a silver halide photographic material (although said protective layer can be overcoated with ultra thin (i.e. thinner than 0.2 μm) auxiliary layers (e.g. antistatic layers). It is now needed to have protective layers comprising between 0.3 to 0.9 g of gelatin per $m^2$, whereas up until now protective layers comprising between 1 and 2 g gelatine per $m^2$ were not uncommon. Also in such thin protective layers, spacing particles are to be present for the same reasons as set out above. Frequently, due to the thin protective layer, the spacing particles will have a diameter that is 5 to 30 times larger than the thickness of the protective layer, and thus extend far above the surface of said layers. In that case loss of the spacing particles during the processing becomes an even more severe problem.

There is thus a need for providing silver halide photographic materials that can be automatically processed in a short dry to dry time, can be transported easily in automatic film handling systems, both before and after processing, and that do not soil the processing machines.

3. Objects and Summary of the Invention

It is an object of the present invention to provide a silver halide photographic material having good slidability and good antisticking properties before and after processing and that can be processed in a very short (i.e. less than 60 sec) dry to dry processing cycle.

It is an other object of the invention to provide a silver halide photographic material having relatively high surface roughness, so that the silver halide photographic material can smoothly be transported in automatic film handling devices.

It is still a further object of the invention to provide a silver halide photographic material having a relatively high surface roughness, wherein no "starry night" effects nor pinholes are present after processing.

It is an other object of the invention to provide a method for producing polymeric spacing particles that can be used in the manufacture of silver halide photographic materials with good slidability, high surface roughness and with no "starry night" effects after processing.

Other objects and advantages of the invention will become clear from the detailed description hereinafter.

The objects of the invention are realized by providing a silver halide photographic material comprising at least one silver halide emulsion layer and an outermost layer comprising a hydrophillic binder and polymeric spacing particles characterized in that (i) said outermost layer has a thickness between 0.3 to 0.9 μm and (ii) said polymeric spacing particles comprise superficial alkali metal carboxylate or sulphonate groups equivalent to an acid value greater than 1.0 mg KOH per 1 g of polymeric spacing particles.

In a preferred embodiment the average diameter of said polymeric spacing particles is between 5 and 30 times larger, more preferably 5 to 20 times larger, than the thickness of said outermost layer.

In a further preferred embodiment said outermost layer comprises between 0.3 and 0.9 g of gelatine per m².

In a still further preferred embodiment said polymeric spacing particles comprise superficial alkali metal carboxylate or sulphonate groups equivalent to an acid value between 1.0 mg KOH and 20 mg KOH per 1 g of polymeric spacing particles.

DETAILED DESCRIPTION OF THE INVENTION

Throughout this document "outermost layer" can also mean an outermost layer that is overcoated with one or more auxiliary layers, e.g. an antistatic layer, wherein the combined thickness of said auxiliary layer does not exceed 0.2 μm, preferably does not exceed 0.1 μm. "Outermost layer" in the sense defined above can be a protective layer coated upon an silver halide emulsion layer, or when used in a single sided material, it can be a backing layer, with or without antihalation dyes or a protective layer on top of said backing layer.

As explained before, silver halide photographic materials have to comprise as low as possible an amount of water absorbing components (mainly hydrophillic colloids as e.g. gelatine) to be able to be processed in a short (i.e. less than 60 sec.) dry to dry processing cycle. Therefore not only the amount of hydrophillic colloids in the emulsion layer is reduced but also in the protective layer of the material. This brings about a reduction of the thickness of the protective layer, which thickness is now rather between 0.3 and 0.9 μm, while in to prior art materials it was rather between 1 and 2 μm. The amount of hydrophillic colloids e.g. gelatin present in said protective layers is nowadays also limited to 0.3 g to 0.9 g of hydrophillic colloid (e.g. gelatin) per m². Typical binder materials are e.g. gelatin, dextrans, polyamides, polyvinylpyrrolidone, polyvinylalcohol, silica sols, synthetic clays, etc.

The protective layer of a silver halide photographic material according to the present invention is, in most cases, an non-overcoated outermost layer. It is however possible that on said protective layer, comprising polymeric spacing particles, one or more auxiliary layers are coated, e.g. an antistatic layer, provided that the combined amount of hydrophillic binder (e.g. gelatin and others as described above) in said auxiliary layers is lower than 0.2 g/m², preferably lower than 0.1 g/m², which corresponds to a combined thickness of said auxiliary layers of at most 0.2 μm, preferably at most 0.1 μm.

The use of dry automatic film handling systems becomes widespread and said film handling systems do handle (transport) the dry films very rapidly. For good transportation through such fast automatic film handling systems, before exposure, without problems of sticking, statics, etc., the outermost layer of a silver halide photographic material comprises preferably polymeric spacing particles, having a diameter of at least 4 μm. In a more preferred embodiment said spacing particles have a diameter of equal to or larger than 5 μm, in the most preferred embodiment said diameter is equal to or larger than 6 μm. The diameter of the spacing particles is in any case substantially larger than the thickness of the outermost layer, said thickness-being between 0.3 μm and 0.9 μm. In a further preferred embodiment the size distribution of the spacing particles is narrow. The smaller particles in the distribution are ineffective as spacing particle, and the larger particles can adversely affect the clarity of the material after processing, as these larger particles increase the scattering of light. A narrow distribution of spacing particles makes it also possible to minimize the amount of spacing particles necessary. A narrow size distribution is in this case defined as a distribution wherein the ratio of the volume average diameter ($d_{v50}$) over the numerical average diameter ($d_{n50}$) is lower than 1.50, preferably lower than 1.25.

It has now be found that, when using polymeric spacing particles comprising alkali metal carboxylate or sulphonate groups equivalent to an acid value greater than 1.0 mg KOH per 1 g of polymeric spacing particles at the surface of said spacing particles (in other words spacing particles comprising superficial alkali metal carboxylate or sulphonate groups equivalent to an acid value greater than 1.0 mg KOH per 1 g of polymeric spacing particles), it is possible to provide a photographic material having polymeric spacing particles incorporated in the outermost layer even when the average diameter of said polymeric spacing particles is 5 to 20 times, even up to 30 times larger than the thickness of said outermost layer without loss of spacing particles during processing. In a preferred embodiment the polymeric spacing particles comprise superficial alkali metal or ammonium carboxylate or sulphonate groups equivalent to an acid value between 1.0 mg KOH and 20 mg KOH per 1 g of polymeric spacing particles.

In a more preferred embodiment the polymeric spacing particles comprise superficial carboxylate groups and the alkali metal is sodium or potassium.

In the most preferred embodiment said superficial carboxylate groups originate from poly(styrene-co-maleic acid) present at the surface of said spacing polymeric particles.

In a silver halide-photographic material according to the present invention, the outermost layer comprises between 1 mg/m² and 1000 mg/m² of polymeric spacing particles. Preferably the amount of spacing particles is between 5 and 500 mg/m² and most preferably said amount is between 10 and 100 mg/m².

Any type of polymeric spacing particles can be used according to the present invention when the requirements concerning the alkali metal carboxylate or sulphonate groups exposed above are met. It is e.g. possible to use polymeric particles produced by polymerization of α,β-ethylenically unsaturated monomers, wherein at least one of the monomers carries a carboxylate or sulphonate group. In this case said carboxylate or sulphonate groups are present throughout the bulk of the polymeric spacing particles. This means that a quite large amount of a monomer comprising a carboxylate or sulphonate group has to be incorporated in the particles to have enough carboxylate or sulphonate groups present on the surface of the particles. The need to incorporate in such particles a large amount of α,β-ethylenically unsaturated monomers, carrying a carboxylate or sulphonate group, limits the degrees of freedom in the composition of the bulk of the polymeric spacing particles.

It is preferred, in silver halide materials according to the present invention, to use polymeric spacing particles wherein said carboxylate or sulphonate groups are only located on the surface of the spacing particles, because in these particles the composition of the bulk of said particles can be more freely chosen and can be adapted to other demands, e.g. heat stability, solvent stability, etc, made on the spacing particles. In a most preferred embodiment, spherical polymeric particles are used carrying a kind of "hairy hydrophillic protuberances" created by incorporation in the surface of the spacing particles of graft-copolymers of hydrophillic graft-polymerizable (co)polymers. Such particles are described in EP-B 080 225, which is incorporated herein by reference. Said spacing particles have an average particle size between about 0.5 and about 5 μm and a glass transition temperature of at least 40° C. The disclosure in EP-B 080 225 is limited to polymer beads with a maximal diameter of 5 μm and it is suggested that it is not possible to produce larger polymer beads with the method disclosed in therein.

In an improvement of the method described in said EP-B 080 225, it is possible to make spacing particles having an average particle size between about 0.5 μm and 10 μm, thus extending the range of diameters that can be produced by a single simple method. The improved method makes it possible not only to produce polymeric beads with a volume average diameter from 0.5 μm to 10 μm, but makes it possible to produce polymer beads with diameters above 5 μm and still having a narrow size distribution. A narrow size distribution is in this case defined as a distribution wherein the ratio of the volume average diameter ($d_{v50}$) over the numerical average diameter ($d_{n50}$) is lower than 1.50, preferably lower than 1.25. The particle size distribution is measured with a COULTER COUNTER (registered trade mark) MULTIZISER particle size analyzer operating according to the principles of electrolyte displacement in narrow aperture and marketed by COULTER ELECTRONICS Corp. Northwell Drive, Luton, Bedfordshire, LC 33, UK.

The improved method comprises the steps of:

(i) dissolving at least one graft-polymerizable (co) polymer comprising alkali metal or ammonium carboxylate or sulphonate groups, together with water-soluble persulphates, in water but in the absence of any polar, water-miscible organic solvent, forming solution A.

(ii) heating solution A to a temperature ranging from 50° C. to 75° C. under continuous stirring, forming macroradicals of said graft-polymerizable (co)polymer, soluble in water.

(iii) mixing in an aqueous solvent mixture, comprising water and a polar water-miscible organic solvent, at least one α,β-ethylenically unsaturated monomer, capable of forming a polymer that is soluble in the monomer(s) present in said aqueous solvent mixture but which is insoluble in said aqueous solvent mixture, forming solution B.

(iv) heating said solution B (v) mixing said heated solution B and said solution A under continuous stirring and (vi) further heating said mixture of said solution A and said solution B to a temperature from 50° C. to the reflux temperature thereof with continuous stirring.

In solution A said graft-polymerizable (co)polymer is added in such an amount as to have after mixing of solution A and solution B a ratio of said graft-polymerizable (co) polymer to said α,β-ethylenically unsaturated monomer(s) in the range from 1:100 to 15:100. The polymerization initiator (water soluble sulphates) is added to said solution A in such an amount as to have, after mixing of solution A and solution B, a ratio of said initiator to said α,β-ethylenically unsaturated monomer(s) from 0.1:100 to 6:100.

It is preferred that the reaction mixture is stirred at a stirring rate of about 100 rotations per minute, preferably lower.

This preparation method for polymeric spacing particles is simple, proceeds in a basically aqueous reaction medium and in a single step reaction. It is moreover very simple to recover the polymeric beads from the reaction mixture, by acidifying said mixture. Upon acidifying the beads (polymeric spacing particles) are flocculated and can be separated by filtration. After filtration, eventual washing and drying of the polymeric spacing particles, the solid residue can easily be redispersed in any medium (aqueous, organic, comprising colloids, etc) by simple stirring and adjustment of the pH to a value of at least 4.5, whereby the carboxylic acid or sulphonic acid groups are, at least partially, transformed again in alkali metal or ammonium carboxylates or sulphonates. The method allows for a great choice of α,β-ethylenically unsaturated monomers to be used and yields particles with a homogeneous particle size distribution.

The α,β-ethylenically unsaturated monomer(s) used in the production of polymeric spacing particles according to the present invention are chosen so that they are soluble in the aqueous solvent mixture. The polymer(s) formed therefrom are insoluble in the aqueous solvent mixture but soluble in the monomer(s) used, and the polymer beads have a glass transition temperature (Tg) of at least 40° C.

Suitable α,β-ethylenically unsaturated monomers for use in the preparation of the polymer beads are e.g. styrene, vinyltoluene and substituted vinyltoluene e.g. vinyl benzyl chloride and the homologues thereof, chlorostyrene, alkyl methacrylates e.g. methyl methacrylate, ethyl methacrylate, propyl methacrylate, butyl methacrylate and the higher methacrylates, e.g. stearyl methacrylate; substituted alkyl methacrylates e.g. hydroxyethyl methacrylate; butadiene, isobutylene, chlorobutadiene, 2-methylbutadiene; vinyl pyridines e.g. 2- and 4-vinylpyridine, etc. A combination of these monomers as well as one of them alone may be chosen depending on the particular needs. Other monomers than those listed above can be used if only they fulfil the solubility and Tg requirements set. It is possible to combine one or more of the monomers described above with other monomers that themselves do not comply with the requirements described herein for the α,β-ethylenically unsaturated monomers. For instance vinylidene chloride, vinyl chloride, acrylonitrile, and methacrylonitrile are not solvents for their own polymers and can thus not be used for the formation of homopolymers. Nevertheless they can be combined with one or more suitable monomer complying with the requirements set forth to form copolymers that are soluble in the monomer mixture.

From the α,β-ethylenically unsaturated monomers, mentioned above, it is most preferred to use alkylacrylates and alkyl methacrylates.

From the graft-polymerizable polymers disclosed in EP-B 080 225, it is preferred to use for the production of polymeric spacing particles, useful according to the present invention, graft polymerizable polymers carrying carboxyl groups, carboxylic anhydride groups, carboxylate groups, sulphonic acid groups or sulphonate groups. Preferred graft-polymerizable (co)polymers are, e.g. alkali or ammonium salts of co(acrylic acid/styrene) containing 40 to 60 mol % of acrylic acid, co(vinyl acetate/crotonic acid), the reaction products of copoly(styrene/maleic anhydride), of copoly (vinyl acetate/maleic anhydride), of copoly (ethylene/maleic anhydride), or of copoly (N-vinyl pyrrolidone/maleic anhydride) with hydroxyalkyl or aminoalkyl(meth)acrylates, co(styrene/maleic acid monosodium salt). From these polymers, co(styrene/maleic acid monosodium salt) is the most preferred and especially the copolymer containing 50 mol % of styrene and 50 mol % of maleic acid alkali metal salt or ammonium salt. When an alkali metal salt is used it is preferred to use the sodium salt.

It is preferred in the preparation of polymeric spacing particles useful in a silver halide material according to the present invention that the weight ratio of the graft-polymerizable polymer to the α,β-ethylenically unsaturated monomer(s) is generally comprised between 1.0:100 and 15:100.

If the weight of said graft-polymerizable polymer is lowered, e.g., to 0.5 g per 100 g of the α,β-ethylenically unsaturated monomer(s), insufficiently stabilized, coarse polymer particles are obtained, which instead of being spherical have assumed an irregular eliptical shape and size from 10 to 50 μm. Moreover, a large proportion of amorphous precipitate is formed at the same time, which strongly hinders isolation by filtration.

Suitable polar organic liquids that are substantially miscible with water and that are solvents for the monomer(s) added are the lower alcohols e.g. methanol, ethanol, and isopropanol and dioxan, acetone, acetonitrile, dimethylformamide, etc. It is preferred to use lower aliphatic alcohols as polar organic solvent to produce polymeric spacing particles useful in a silver halide photographic material according to the present invention. It is preferred that said lower aliphatic alcohols, especially methanol, are mixed with water in a weight ratio of lower aliphatic alcohol to water that is comprised between 40:60 and 85:15.

It is possible to influence the results as to the nature and size of the polymer beads into a desired sense by changing the quantitative proportion of organic solvent(s) to water.

The optimum quantitative proportion between these solvents can easily be determined for any selected combination of graft-polymerizable polymer and monomer(s) by making a few tests with changing amounts of organic solvent and water. When e.g. co(styrene/maleic acid monosodium salt) is used as graft-polymerizable polymer, methyl methacrylate as monomer, and potassium persulphate as initiator, the desired average bead size obtained, for a given amount of reactants, can be predetermined by selecting a given quantitative proportion of water and water-miscible solvent e.g. methanol. A quantitative proportion of 70 parts by weight (70% w/w) of water and 30 parts by weight of methanol yields a mixture of very small beads and an undesired amount of amorphous precipitate owing to insufficient solubility of the graft polymer formed. A proportion of water/methanol (43/57 w/w) yields homodisperse beads with an average size of approximately 0.8 μm. A proportion of 25/75 gives beads sizing 2.70 μm ; a 22/78 w/w ratio water/methanol gives homodisperse beads of 3.70 μm, and a ratio 17/83 produces homodisperse beads of 8.50 μm.

The polymerization initiator being soluble in the aqueous reaction medium and forming free radicals upon heating is generally present in an amount from 0.1 to 6% by weight based on the amount of monomer(s) present. Suitable polymerization initiators for use in the preparation of the polymer beads according to the invention are persulphates, e.g. potassium, sodium and ammonium persulphates or mixtures thereof. Although the use of persulphates is preferred, it is also possible to use peroxides, e.g. benzylperoxide, laurylperoxide, as polymerization initiator.

Amounts of $0.5 \times 10^{-3}$ to $15 \times 10^{-3}$ mol of polymerization initiator per liter of reaction medium yield excellent dispersions of polymer beads.

A reduction in the amount of polymerization initiator, keeping the amount of other reactant and the water/methanol ratio constant, leads to the formation of larger polymer beads, whereas an increase in the amount of polymerization initiator entails a reduction in the size of the polymer beads. As a consequence, the amount of polymerization initiator in the reaction medium constitutes a parameter that also defines the size of the polymer beads. In other words the results aimed at can be attained by controlling i.a. the exact amount of the polymerization initiator.

It is possible to use the polymerization initiator in amounts outside the range given hereinbefore, though from $15 \times 10^{-3}$ mol on of polymerization initiator per liter of reaction medium the polymer beads are very small. Very low amounts of $0.1 \times 10^{-3}$ mol of polymerization initiator fail to produce dispersions, but mainly form an amorphous precipitate.

Polymeric beads, produced according to the method above, can be cross-linked and made insoluble in organic solvents. Such cross-linked polymeric particles are disclosed in U.S. Pat. No. 5,252,445 which is incorporated herein by reference.

It is possible to incorporate in the reaction mixture also a silane monomer. By incorporating a silane monomer the beads can be easily cross-linked and become, when compared to the cross-linked beads described in U.S. Pat. No. 5,252,445, better heat-resistant. Preferably said silane monomer corresponds to the following general formula:

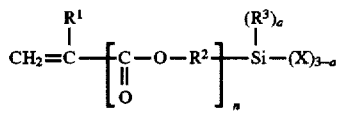

wherein $R^1$=H or $CH_3$ $R^2$=a linear or branched $C_{2-C12}$-alkylene group, the chain of which may be interrupted by at least one member selected from the group consisting of —O—, —NH—, —COO— or —NH—COO— groups $R^3$ = linear or branched $C_1-C_6$ alkyl group or a phenyl group
X = a hydrolysable group
a = 0, 1 or 2
n = 0 or 1.

Such polymeric beads have been disclosed in European Application 94202424.1 filed on Aug. 31, 1994, that is incorporated herein by reference.

The polymeric beads, useful in an outermost layer of a silver halide photographic material according to the present invention and prepared according to the method described above, are composed of a nucleus and a kind of "hairy" protuberances surrounding said nucleus.

The nucleus of the beads consists of a bundle of intertwisted and cross-linked polymer chains, which is insoluble in the aqueous reaction medium, obtained by said polymerization reaction of the α,β-ethylenically unsaturated monomer(s) (and an eventual cross-linking reaction by said incorporated silane monomers) and of a small proportion of same polymer chains obtained by graft (co)polymerization of the α,β-ethylenically unsaturated monomer(s), the silane monomers and the initial graft-polymerizable polymer. The "hairy" protuberances, surrounding the nucleus, are formed by the graft-polymerizable polymer. The formation happens "in situ" by the reaction of the macroradicals, derived from the graft-polymerizable (co)polymer, and the monomer(s) or the already formed homo- or copolymers from said monomers, present in the reaction medium. These "hairy" protuberances comprise an hydrophobic portion and an hydrophillic portion. The hydrophobic portion is compatible with the (α,β-ethylenically unsaturated monomer(s) and is at least partially copolymerized with said α,β-ethylenically unsaturated monomer(s). The hydrophillic portion of said graft-(co)polymer extend from the surface of the nucleus into the surrounding aqueous reaction medium as a kind of "hairy" protuberances. These hairy protuberances form a kind of envelope around the nucleus and act as steric and ionic stabilizer for the polymeric beads.

It is believed that the presence of said "hairy protuberances" introducing alkali metal carboxylates or sulphonates on the surface of polymeric spacing particles enhance the interaction between the gelatin, present in the outermost layer of the silver halide photographic material, and the spacing particles. There is however no theory on the precise nature of the interaction (simply physical or a combined chemical/physical interaction). Surprisingly it was found that the possible interaction between gelatin and polymeric spacing particles, prepared as described above, is not influenced by the type of gelatin hardening substance that is used. I.e. the polymeric spacing particles, prepared as explained above, stay well attached to the silver halide photographic material regardless of said material is harden with aldehyde type hardeners (e.g. formaldehyde), vinylsulphone hardeners, chromium hardeners, etc.

The outermost layer on a silver halide material according to the present invention can comprise, apart from gelatin, any conventional ingredient, e.g. dextrans, polyacrylamides, surfactants, antistatic agents, hardeners, lubricants, etc. The outermost layer on a silver halide material according to the present invention can also be gelatin-free and can comprise either other hydrophillic colloids and/or non colloid hydrophillic substances (e.g. synthetic clay) as binder material.

Silver halide photographic materials according to the present invention can be of any type known in the art, e.g. black and white materials, colour materials, materials designed for use in graphic arts, printing plates, materials for use in medical diagnosis, motion picture materials, diffusion transfer materials (both the emulsion layers and the acceptor layer comprising nucleation nuclei), in a dye diffusion transfer process operating with silver halide emulsion layers, etc.

For the composition of silver halide emulsion layers reference is made e.g. to Research Disclosure 17,643 of December 1978 and Research Disclosure 307,105 of November 1989.

MEASUREMENT A : THE EQUIVALENT AMOUNT OF KOH

In a water/methanol dispersion comprising 100 g of spacing particles, the spacing particles are precipitated by addition of an amount of HCl until a pH of 1.00 is reached. The precipitated spacing particles are filtrated, washed and dried. The dry powder is stirred in water and by titration with 1.0 N KOH, the amount of carboxylic groups in meq. (milliequivalents) is determined. On the dry powder any residual water has been titrated with the well known Karl Fisher method. By the calculation of the acid number (mg KOH/g of spacing particles) starting from the titration, the amount residual water is taken in account.

MEASUREMENT B : MEASUREMENT OF THE PULL-OFF OF SPACING PARTICLES

A sheet of 24 cm×30 cm of each material was exposed to yield maximum density when developed in the conditions described below. The sheets were processed during the 38 seconds processing cycle in the processing machine CURIX HT530 (Agfa-Gevaert trademarked name) with the following time (in seconds) and temperature (in °C.) characteristics :

| loading: | 0.2 sec. | |
| developing: | 9.3 sec. | 35° C. in developer described below |
| cross-over: | 1.4 sec. | |
| rinsing: | 0.9 sec. | |
| cross-over: | 1.5 sec. | |
| fixing: | 6.6 sec. | 35° C. in fixer described below |
| cross-over: | 2.0 sec. | |
| rinsing: | 4.4 sec. | 20° C. |
| cross-over: | 4.6 sec. | |
| drying: | 6.7 sec. | |
| total | 37.6 sec. | |

The processing was run in a developer and fixer solution made from concentrated stock solutions, free from hardening agents as illustrated hereinafter.

Composition of Developer

| -concentrated part: | |
|---|---|
| water | 200 ml |
| potassium bromide | 12 grams |
| potassium sulphite (65% solution) | 249 grams |
| ethylenediaminetetraacetic acid, sodium salt, trihydrate | 9.6 grams |
| hydroquinone | 106 grams |
| 5-methylbenzotriazole | 0.076 grams |
| 1-phenyl-5-mercaptotetrazole | 0.040 grams |
| sodiumtetraborate (decahydrate) | 70 grams |
| potassium carbonate | 38 grams |
| potassium hydroxide | 49 grams |
| diethylene glycol | 111 grams |
| potassium iodide | 0.022 grams |
| 4-hydroxymethyl-4methyl-1phenyl-3-pyrazolidinone | 3 grams |

11

Water to make 1 liter
pH adjusted to 11.15 at 25° C. with potassium hydroxide.
For initiation of the processing one part of the concentrated developer was mixed with 3 parts of water.
No starter was added.
The pH of this mixture was 10.30 at 25° C.
Composition of Fixer:

| -concentrated part | |
| --- | --- |
| ammonium thiosulphate (78% solution) | 661 grams |
| sodium sulphite | 54 grams |
| boric acid | 25 grams |
| sodium acetate-trihydrate | 70 grams |
| acetic acid | 40 grams | water to make 1 liter
pH adjusted with acetic acid to 5.30 at 25° C.

To make this fixer ready for use one part of this concentrated part was mixed with 4 parts of water. A pH of 5.25 was measured at 25° C.

Then both sides the sheet were examined with a scanning electron microscope at enlargement 500 times and 5 fields were photographed. On these photographs the percentage of spacing particles that were pulled of was visually determined (under scanning electron microscope a spacing particle show an elevation, while a the location of a pulled-off spacing particles a crater is seen). The values of the 5 fields and the both sides were averaged to give the percentage pull-off.

EXAMPLES

1. PREPARATION OF THE POLYMERIC SPACING PARTICLES

PREPARATION EXAMPLE 1

POLYMERIC SPACING PARTICLES USEFUL ACCORDING TO THE INVENTION (SP1).

At room temperature 1192 g of a 10% aqueous solution of poly(styrene-co-maleic acid anhydride) adjusted to pH 7.0 by means of sodium hydroxide, 2690 g of distilled water, and 12.80 g ($4.64 \times 10^{-3}$ mol per liter of reaction medium) of potassium persulphate were placed successively in a 20.0 liter reaction vessel equipped with a stirrer, a thermometer, and a nitrogen inlet above the liquid level.

During the entire reaction the atmosphere in the reaction flask was rinsed continuously with nitrogen to keep it free from air.

The mixture was stirred constantly at 50 rpm. After 10 minutes of stirring, the persulphate had dissolved and 3250 g of ethanol and 2100 g of methylmethacrylate were added at once. The ratio ethanol:water was 46.3:53.7.

Stirring was then continued at 25 rpm (rotation per minute) for 90 minutes at room temperature. The reaction mixture remained turbid all the time.

Next, the reaction mixture was heated gradually with a water bath at 65° C. As soon as the temperature in the reaction flask reached 30° C., the reaction mixture became transparent.

At a temperature of 55° to 60° C. the first turbidity was usually seen. After a total heating time of 30 minutes the temperature in the reaction vessel reached 65° C. At this very moment a weak reflux took place.

The increase in temperature from 60° to 80° C. took almost 45 minutes. During this period the clear solution changed into a milky white dispersion.

12

The temperature remained for almost 5 minutes a 80° C. and then started falling gradually to 65° C. in about 30 minutes.

Subsequently, the dispersion was stirred for 16 hours on the water bath at 65° C.

After the polymerization the dispersion was mixed with 600 g of demineralized water and cooled to 30° C. with stirring.

Finally, the dispersion was filtered through a nylon cloth with meshes sizing 75×75 µm. Yield : 9.8 kg of dispersion of polymethyl methacrylate beads stabilized with a graft copolymer of methyl methacrylate and co(styrene/maleic acid monosodium alt) comprising 22.0 g of beads per 100 g of dispersion.

The average size of the polymer beads was measured with a COULTER COUNTER (registered trade mark) MULTI-ZISER particle size analyzer operating according to the principles of electrolyte displacement in narrow aperture and marketed by COULTER ELECTRONICS Corp. Northwell Drive, Luton, Bedfordshire, LC 33, UK. In said apparatus particles suspended in an electrolyte (e.g. aqueous sodium chloride) are forced through a small aperture, across which an electric current path has been established. The particles passing one-by-one each displace electrolyte in the aperture producing a pulse equal to the displaced volume of electrolyte. This particle volume response is the basis for said measurement. Also the acid value was measured according to test A. The results are summarized in table 1.

PREPARATION EXAMPLE 2

POLYMERIC SPACING PARTICLES USEFUL ACCORDING TO THE INVENTION (SP2).

The reaction was carried out in a 10 liter double-walled glass cylinder, equipped with a reflux cooler, a stirrer, a thermometer and an inlet, above liquid level, for $N_2$. In this reaction vessel were placed, at room temperature:

159.16 g of a 19.1% (in weight) aqueous solution of poly(styrene-co-maleic acid anhydride), adjusted to pH=7.0, 1355.2 g of distilled water, citric acid to pH 5.

The reaction vessel was continuously rinsed with $N_2$ and kept free from air.

The above mixture was stirred at 100 rpm, after 5 minutes, the homogeneous solution was heated to 65° C., after 45 minutes that temperature was reached and 6.0 g of potassiumpersulphate were added at once. The reaction mixture was stirred for another 120 minutes and kept at 65° C. In this reaction macroradicals are formed.

Then 4699.2 g methanol were added to the reaction mixture and, after the methanol, a premixed solution, kept at room temperature, of 1490.35 g of methylmethacrylate, 30.4 g of stearylmethacrylate and 30.44 g of HOSTAPAL-W (tradename for Nonylfenoxypolyglycol from Hoechst AG, Frankfurt, Germany) was added at once to the reaction mixture. The mixture is then thermostatically controlled at 65° C., after about 35 minutes, the clear solution changed into a milky white dispersion. The polymerization was continued at a constant temperature of 65° C. for 18 hours.

After the polymerization the dispersion was cooled to 30° C. with stirring.

Finally, the dispersion was filtered through a nylon cloth with meshes sizing 75×75 pm.

Yield: 7670 g of dispersion of poly(methyl methacrylate-co-stearyl methacrylate) beads, stabilized with a graft copolymer of poly(methyl methacrylate-co-stearyl methacrylate) and poly(styrene-co-maleic acid mono sodium salt) comprising 20.4 g of beads per 100 g of dispersion. The average particles size and the acid value were measured as for preparation example 1, and are reported in table 1.

PREPARATION EXAMPLE 3

POLYMERIC SPACING PARTICLES USEFUL ACCORDING TO THE INVENTION (SP3).

Preparation example 2 was repeated, except for the ratio methanol/water in the reaction medium.

Instead of 1355.2 g water, only 1169.7 g were used, and instead of 4699.2 g of methanol, 4884.6 g were used.

Yield: 7640 g of dispersion of poly(methyl methacrylate-co-stearyl methacrylate) beads, stabilized with a graft copolymer of poly(methyl methacrylate-co-stearyl methacrylate) and poly(styrene-co-maleic acid mono sodium salt) comprising 20.48 g of beads per 100 g of dispersion. The average particles size and the acid value were measured as for preparation example 1, and are reported in table 1.

PREPARATION EXAMPLE 4

POLYMERIC SPACING PARTICLES USEFUL ACCORDING TO THE INVENTION (SP4).

Preparation example 2 was repeated, except for the ratio methanol/water and the amount of poly(styrene-co-maleic acid mono sodium salt) in the reaction medium.

In a reaction vessel were placed, at room temperature:

235.13 g of a 20.0% (in weight) aqueous solution of poly(styrene-co-maleic acid anhydride), adjusted to pH=7.0, 2234.9 g of distilled water, citric acid to pH 5.

The reaction vessel was continuously rinsed with $N_2$ and kept free from air.

The above mixture was stirred at 100 rpm, after 5 minutes, the homogeneous solution was heated to 65° C., after 45 minutes that temperature was reached and 6.20 g of potassiumpersulphate were added at once. The reaction mixture was stirred for another 120 minutes and kept at 65° C. In this reaction macroradicals are formed.

Then 10329 g methanol were added to the reaction mixture and, after the methanol, a premixed solution, kept at room temperature, of 3073.84 g of methylmethacrylate, 62.7 g of stearylmethacrylate and 62.7 g of HOSTAPAL-W (tradename for Nonylfenoxypolyglycol from Hoechst AG, Frankfurt, Germany) was added at once to the reaction mixture. The mixture is then thermostatically controlled at 65° C., after about 35 minutes, the clear solution changed into a milky white dispersion. The polymerization was continued at a constant temperature of 65° C. for 18 hours.

After the polymerization the dispersion was cooled to 30° C. with stirring.

Finally, the dispersion was filtered through a nylon cloth with meshes sizing 75×75 pm.

Yield: 15.9 Kg of dispersion of poly(methyl methacrylate-co-stearyl methacrylate) beads, stabilized with a graft copolymer of poly(methyl methacrylate-co-stearyl methacrylate) and poly(styrene-co-maleic acid mono sodium salt) comprising 20.1 g of beads per 100 g of dispersion. The average particles size and the acid value were measured as for preparation example 1, and are reported in table 1.

PREPARATION EXAMPLE 5

POLYMERIC SPACING PARTICLES USEFUL ACCORDING TO THE INVENTION (SP5).

The reaction was carried out in a 20 liter double-walled glass cylinder, equipped with a reflux cooler, a stirrer, a thermometer and an inlet, above liquid level, for $N_2$. In this reaction vessel were placed, at room temperature:

258.76 g of a 20.0% (in weight) aqueous solution of poly(styrene-co-maleic acid anhydride), adjusted to pH=7.0, 2156.44 g of distilled water, citric acid to pH 5.

The reaction vessel was continuously rinsed with $N_2$ and kept free from air.

The above mixture was stirred at 100 rpm, after 5 minutes, the homogeneous solution was heated to 65° C., after 45 minutes that temperature was reached and 6.90 g of potassiumpersulphate were added at once. The reaction mixture was stirred for another 120 minutes and kept at 65° C. In this reaction macroradicals are formed.

Then 10075.74 g methanol were added to the reaction mixture and, after the methanol, a premixed solution, kept at room temperature, of 3381.00 g of methylmethacrylate, 69.0 g of stearylmethacrylate and 69.0 g of HOSTAPAL-W (tradename for Nonylfenoxypolyglycol from Hoechst AG, Frankfurt, Germany) was added at once to the reaction mixture. The mixture is then thermostatically controlled at 65° C., after about 35 minutes, the clear solution changed into a milky white dispersion. The polymerization continued at a constant temperature of 65° C. for 18 hours.

After the polymerization the dispersion was cooled to 30° C. with stirring.

Finally, the dispersion was filtered through a nylon cloth with meshes sizing 75×75 μm.

Yield: 15800 g of dispersion of poly(methyl methacrylate-co-stearyl methacrylate) beads, stabilized with a graft copolymer of poly(methyl methacrylate-co-stearyl methacrylate) and poly(styrene-co-maleic acid mono sodium salt) comprising 22.2 g of beads per 100 g of dispersion. The average particles size and the acid value were measured as for preparation example 1, and are reported in table 1.

PREPARATION EXAMPLE 6

POLYMERIC SPACING PARTICLES USEFUL ACCORDING TO THE INVENTION (SP6).

The reaction was carried out in a 10 liter double-walled glass cylinder, equipped with a reflux cooler, a stirrer, a thermometer and an inlet, above liquid level, for $N_2$. In this reaction vessel were placed, at room temperature:

912.0 g of a 20.0% (in weight) aqueous solution of poly(styrene-co-maleic acid anhydride), adjusted to pH=7.0, 445.2 g of distilled water, citric acid to pH 5.

The reaction vessel was continuously rinsed with $N_2$ and kept free from air.

The above mixture was stirred at 100 rpm, after 5 minutes, the homogeneous solution was heated to 65° C., after 45 minutes that temperature was reached and 6.90 g of potassiumpersulphate were added at once. The reaction mixture was stirred for another 120 minutes and kept at 65° C. In this reaction macroradicals are formed.

Then 5008.4 g methanol were added to the reaction mixture and, after the methanol, a premixed solution, kept at room temperature, of 1490.40 g of methylmethacrylate, 30.4 g of stearylmethacrylate and 30.4 g of HOSTAPAL-W (tradename for Nonylfenoxypolyglycol from Hoechst AG, Frankfurt, Germany) was added at once to the reaction mixture. The mixture is then thermostatically controlled at 65° C., after about 35 minutes, the clear solution changed into a milky white dispersion. The polymerization continued at a constant temperature of 65° C. for 18 hours.

After the polymerization the dispersion was cooled to 30° C. with stirring.

Finally, the dispersion was filtered through a nylon cloth with meshes sizing 75×75 µm.

Yield: 7810.0 g of dispersion of poly(methyl methacrylate-co-stearyl methacrylate) beads, stabilized with a graft copolymer of poly(methyl methacrylate-co-stearyl methacrylate) and poly(styrene-co-maleic acid mono sodium salt) comprising 21.3 g of beads per 100 g of dispersion. The average particles size and the acid value were measured as for preparation example 1, and are reported in table 1.

PREPARATION EXAMPLE 7

POLYMERIC SPACING PARTICLES USEFUL ACCORDING TO THE INVENTION (SP7).

Preparation of Solution A:

A 1 liter double-walled cylinder, equipped with a reflux cooler, a stirrer, a thermometer and a N2-inlet, below liquid level, was charged with 541.75 g of a 10% aqueous solution of poly(styrene-co-maleic acid mono sodium salt). During the entire reaction the atmosphere in the reaction flask was rinsed with nitrogen to keep it free from air. The solution was stirred continuously at 100 rpm and heated to 65° C.

Then 7.223 g of $K_2S_2O_8$ was added to the solution. The reaction mixture was kept at 65° C. for another 2 hours. The obtained mixture was cooled to room temperature and was later used to initiate the polymerisation.

Preparation of Solution B

In a 20 liter double-walled reaction vessel, provided with a reflux cooler, a stirrer, a thermometer and a $N_2$-inlet, below liquid level, were placed, at room temperature:

1823.12 g of demineralized water 10324.6 g of methanol 3217.87 g of methyl methacrylate 65.67 g of stearyl methacrylate 65.67 g of HOSTAPAL w (tradename for Nonylfenoxy-polyglycol from Hoechst AG, Frankfurt, Germany)

4 g of citric acid

The atmosphere in the reaction flask was rinsed continuously with nitrogen to keep in free from air. The mixture was stirred constantly at 55 RPM and was heated to 65° C.

Mixing of Solution A and solution B

Then, 492.5 g of Solution A prepared in step 1, was added over a period of 3 minutes to solution B.

The polymerisation was continued at a temperature between 65° C. and the reflux temperature of the reaction medium. 1 minute after the addition of solution A to solution B, the clear solution B changed into a milky white dispersion.

After the polymerisation the dispersion was cooled under continuous stirring to room temperature. Finally, the dispersion was filtered through a nylon cloth with meshes sizing 60×60 µm.

Yield: 15.9 kg of dispersion of poly(methyl methacrylate-co-stearyl methacrylate) beads, stabilized with a graft copolymer of poly(methyl methacrylate-co-stearyl methacrylate) and poly(styrene-co-maleic acid mono sodium salt) comprising 21.19 g beads per 100 g dispersion. The average particles size and the acid value were measured as for preparation example 1, and are reported in table 1.

PREPARATION EXAMPLE 8

COMPARATIVE POLYMERIC SPACING PARTICLES (CSP1)

To a solution of 9 kg gelatin in 100 l water, 1.8 liter of a solution of 25% by weight of MERSOLAT H 76 (tradename for a sodiumalkanesulphonate of Bayer AG, Leverkusen, Germany), 35 liter of a solution of 3.5 kg methylmethacrylate in a mixture of methylenechloride/butanone/ethylacetate in 50/20/30 ratio were added under stirring (120 rpm) at 42° C. After 5 minutes the organic solvents were distilled away and after 5 hours a dispersion of polymethylmethacrylate beads in a gelatine solution was obtained, comprising 3% by weight of polymer beads. The average particles size and the acid value were measured as for preparation example 1, and are reported in table 1.

PREPARATION EXAMPLE 9

COMPARATIVE POLYMERIC SPACING PARTICLES (CSP2)

To a solution of 8.1 kg gelatin in 90 l water, 1.8 liter of a solution of 25% by weight of MERSOLAT H 76 (tradename for a sodiumallkanesulphonate of Bayer AG, Leverkusen, Germany) , 31.6 liter of a solution of 3.2 kg methylmethacrylate in a mixture of methylenechloride/butanone/ethylacetate in 50/20/30 ratio was added under stirring (200 rpm) at 42° C. After 5 minutes the organic solvents were distilled away and after 5 hours a dispersion of polymethylmethacrylate beads in a gelatine solution was obtained, comprising 3% by weight of polymer beads. The average particles size and the acid value were measured as for preparation example 1, and are reported in table 1.

TABLE 1

| Spacing particles | KOH equivalent per g | $d_{v50}$ in µm | $d_{n50}$ in µm |
|---|---|---|---|
| SP3 | 5.04 | 4.03 | 4.00 |
| SP4 | 1.85 | 5.82 | 5.76 |
| SP5 | 1.40 | 9.03 | 8.36 |
| SP6 | 13.3 | 5.16 | 4.30 |
| SP7 | n.a.* | 6.34 | 6.21 |
| CSP1 | 0 | 6.59 | 2.78 |
| CSP2 | 0 | 2.34 | 1.08 |

*n.a. not available

PHOTOGRAPHIC EXAMPLES

1. Emulsion

A photographic silver iodo-bromide emulsion containing 2.0 mole % of silver iodide was prepared by a conventional single jet method in a vessel containing, potassium bromide, potassium iodide and 40 g of gelatin. The ammoniacal silver nitrate solution was held at 42° C. as well as the emulsion vessel, containing the halide salts. At a constant rate of 300 ml per minute the precipitation time was ended after 10 minutes and followed by a physical ripening time of 40 minutes. After that time an additional amount of 20 g of gelatin was added. The obtained emulsion was of an average grain diameter of 0.62 µm and contained approximately 90 g of silver nitrate per kg of the dispersion after addition of 3 moles of silver nitrate.

After addition of sulphuric acid to a pH value of 3.5 stirring was stopped and after sedimentation the supernatant liquid was removed. The washing procedure was started after a scrape-rudder was installed and after addition of polystyrene sulphonic acid in the first turn to get a quantitative flocculate without silver losses.

During the redispersion of the emulsion 150 g of gelatin were added so that the weight ratio of gelatin to silver nitrate was 0.42, the emulsion containing an amount of silver bromo-iodide equivalent with 190 g of silver nitrate per kg.

The emulsion crystals were chemically ripened with sulphur and gold at 47° C. for 4 hours to get an optimized relation between fog and sensitivity.

2. Protective layer

A protective coating composition was prepared containing per liter the following ingredients in demineralized water:

35.4 g of an inert gelatin 37 g of silica sol with silica particles having an average diameter of from 7 to 10 nm 225 mg of chromium acetate as a hardening agent 300 mg of ammoniumperfluoro-octanoate (FC143, trade name product from 3M) and 750 mg of N-polyoxyethylene-N-ethyl-perfluoro-octane-sulphonamide (FC170C, trade name product from 3M) as surfactants 1500 mg of phenol as preserving agent 1000 mg of Mobilcer Q from MOBIL OIL as a lubricant Formaldehyde was added as a hardening agent. The nature of polymeric spacing particles and the coating thickness of the protective layer was varied throughout the examples. The amount of spacing particles was adapted so as to have in each case 25 mg of spacing particles present per m² and per side. In all examples the solutions for the emulsion coating and for the protective coating were coated simultaneously on both sides of a polyethylene terephthalate film support having a thickness of 175 µm.

EXAMPLE 1 (E 1)

The coating solution for the protective layer comprised spacing particles CSP ($d_{v50}$=9.03) and was coated at a thickness of 0.75 µm (0.75 g gelatin/m²).

EXAMPLE 2 (E 2)

Example 1 was repeated except for the coating thickness, which was 0.5 µm (0.5 g gelatin/m²).

EXAMPLE 3 (E3)

Example 1 was repeated except for the coating thickness, which was 0.3 µm (0.3 g gelatin/m²).

EXAMPLE 4 (E 4)

Example 2 was repeated except for the spacing particles. The coating solution for the protective layer comprised spacing particles SP4 ($d_{v50}$=5.82).

COMPARATIVE EXAMPLE 1 (CE 1)

Example 2 was repeated except for the spacing particles. The coating solution for the protective layer comprised spacing particles CSP1 ($d_{v50}$=6.59).

COMPARATIVE EXAMPLE 2 (CE 2)

Comparative example 1 was repeated, except for the coating thickness of the protective layer, which was 1.0 pm (1.0 g gelatin/m²).

COMPARATIVE EXAMPLE 3 (CE 3)

Comparative example 1 was repeated except for the spacing particles. The coating solution for the protective layer comprised spacing particles CSP2 ($d_{v50}$=2.34).

COMPARATIVE EXAMPLE 4 (CE 4)

Comparative example 3 was repeated, except for the coating thickness of the protective layer, which was 1.0 µm (1.0 g gelatin/m²).

For each of the samples the pull of 1 of the spacing particles was measured according to measurement B. The values are reported in table 2.

TABLE 2

| Example nr. | $d_{v50}$/thickness AS | Pull-off |
|---|---|---|
| E1 | 12 | 0.5% |
| E2 | 18 | 0.5% |
| E3 | 30 | 1% |
| E4 | 6 | 0% |
| CE1 | 13.2 | >50% |
| CE2 | 6.59 | >50% |
| CE3 | 4.68 | >50% |
| CE4 | 2.34 | <20% |

We claim:

1. A silver halide photographic material comprising at least one silver halide emulsion layer and an outermost layer comprising an hydrophillic binder and polymeric spacing particles wherein
   (i) said outermost layer has a thickness between 0.3 to 0.9 µm and
   (ii) said polymeric spacing particles having a volume average diameter ($d_{v50}$) that is 5 to 30 times larger than said thickness of said outermost layer; comprise on the surface of said particles superficial alkali metal or ammonium carboxylate or sulphonate groups equivalent to an acid value greater than 1.0 mg KOH per 1 g of polymeric spacing particles and said spacing particles having an average volume diameter ($d_{v50}$) and an average numerical diameter ($d_{n50}$) and wherein $d_{v50}/d_{n50} \leq 1.50$.

2. A silver halide photographic material according to claim 1, wherein said polymeric spacing particles comprise superficial alkali metal or ammonium carboxylate or sulphonate groups equivalent to an acid value between 2.5 mg KOH and 20 mg KOH per 1 g of polymeric spacing particles.

3. A silver halide photographic material according to claim 2, wherein said polymeric spacing particles comprise superficial alkali metal or ammonium carboxylate groups originating from poly(styrene-co-maleic acid).

4. A silver halide photographic material according to claim 1, wherein said outermost layer comprises between 0.3 and 0.9 g of gelatin/m².

5. A silver halide photographic material according to claim 1, wherein said outermost layer is over coated with at least one auxiliary layer, said auxiliary layer being at most 0.2 µm thick.

6. A silver halide photographic material according to claim 1, wherein said spacing particles have an average volume diameter ($d_{v50}$) equal to or larger than 5 µm.

* * * * *